United States Patent
Lee et al.

(10) Patent No.: US 11,470,513 B2
(45) Date of Patent: Oct. 11, 2022

(54) APPARATUS AND METHOD FOR SUPPORTING SESSION CONTINUITY IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 16/868,034

(22) Filed: May 6, 2020

(65) Prior Publication Data
US 2020/0359271 A1    Nov. 12, 2020

(30) Foreign Application Priority Data
May 7, 2019   (KR) .......................... 10-2019-0053245

(51) Int. Cl.
    *H04W 4/00*     (2018.01)
    *H04W 36/00*    (2009.01)
    *H04W 36/14*    (2009.01)

(52) U.S. Cl.
    CPC ........... *H04W 36/00* (2013.01); *H04W 36/14* (2013.01)

(58) Field of Classification Search
    CPC combination set(s) only.
    See application file for complete search history.

(56) References Cited

U.S. PATENT DOCUMENTS

| 2019/0029065 A1  | 1/2019 | Park et al. |
| 2019/0053148 A1* | 2/2019 | Lee ....................... H04W 48/18 |
| 2019/0297148 A1* | 9/2019 | Zong ................ H04W 36/0022 |

FOREIGN PATENT DOCUMENTS

| WO | 2018/234085 A1 | 12/2018 |
| WO | 2018/236819 A1 | 12/2018 |
| WO | 2019/034249 A1 | 2/2019 |

OTHER PUBLICATIONS

3GPP; 3GPP TS 24.501; V16.0.2; Mar. 29, 2019; Non-Access-Stratum (NAS) protocol for 5G System (5GS); Stage 3 (Release 16).
Ericsson; Provisioning of Requested NSSAI at mobility update and inter system change to N1 mode; 3GPP TSG CT WG1 Meeting #116; C1-192371; Apr. 8-12, 2019; Xi'an (P.R. of China).
Ericsson; Discussion on how to provide only mapped S-NSSAI of HPLMN to VPLMN; 3GPP TSG CT WG1 Meeting #115; C1-191142; XP 51598059 A; Feb. 25-Mar. 1, 2019; Montreal, Canada.

(Continued)

*Primary Examiner* — Justin Y Lee
(74) *Attorney, Agent, or Firm* — Jefferson IP Law, LLP

(57) ABSTRACT

A method performed by a user equipment (UE) in a wireless communication system is provided. The method includes transmitting, to an access and mobility function (AMF), a registration request message for moving to a first public land mobile network (PLMN) from a second PLMN, receiving, from the AMF, a registration accept message including first single-network slice selection assistance information (S-NSSAI) corresponding to the first PLMN of the AMF, determining whether second S-NSSAI associated with a protocol data unit (PDU) session established for the UE matches to the first S-NSSAI, wherein the second S-NSSAI corresponds to the second PLMN, and locally updating the PDU session based on a result of the determining.

22 Claims, 12 Drawing Sheets

(56) References Cited

OTHER PUBLICATIONS

Qualcomm Incorporated, et al.; TS 23.501: Applicability of UE slicing configuration in roaming scenarios; SA WG2 Meeting #S2-123; S2-178030, XP 51360647 A; Oct. 23-27, 2017; Ljubljana, Slovenia.
International Search Report with Written Opinion dated Aug. 6, 2020; International Appln. No. PCT/KR2020/005966.
European Search Report dated Sep. 16, 2020; European Appln. No. 20173406.8-1212.
Sharp, "Clarification on configured S-NSSAI not associated with a PLMN Alt3," 3GPP TSG-CT WG1 Meeting #112bis C1-186415, Vilnius (Lithuania), Oct. 15-19, 2018.
European Office Action dated Apr. 11, 2022, issued in European Application No. 20173406.8.

\* cited by examiner

APPARATUS AND METHOD FOR SUPPORTING SESSION CONTINUITY IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0053245, filed on May 7, 2019, in the Korean Intellectual Property Office, the disclosure of which is incorporated by reference herein in its entirety.

BACKGROUND

1. Field

The disclosure relates to an apparatus and method for supporting session continuity in a wireless communication system.

2. Description of Related Art

In order to meet the demand with respect to wireless data traffic, which is explosively increasing due to the commercialization of the $4^{th}$ generation (4G) communication system, an improved $5^{th}$ generation (5G) communication system or pre-5G communication system has been developed. For this reason, the 5G communication system or the pre-5G communication system is called a beyond 4G network communication system or a post-long term evolution (LTE) system.

To achieve a high data rate, the implementation of the 5G communication system in an ultra-high-frequency millimeter wave (mmWave) band, for example, a 60 GHz band, has been considered. In order to mitigate path loss of radio waves and increase a transmission distance of radio waves in the ultra-high frequency band, beamforming, massive multiple input multiple output (MIMO), full dimensional MIMO (FD-MIMO), array antenna, analog beam-forming, and large scale antenna techniques are being discussed in regard to the 5G communication system.

Further, for improvement of a system network, in the 5G communication system, technologies such as evolved small cells, advanced small cells, a cloud radio access network (cloud RAN), an ultra-dense network, device-to-device communication (D2D), wireless backhaul, a moving network, cooperative communication, coordinated multi-points (CoMP), reception interference cancellation, and the like, have been developed.

In addition, in the 5G system, hybrid frequency shift keying and quadrature amplitude modulation (FQAM) and sliding window superposition coding (SWSC), which are advanced coding modulation (ACM) methods, and filter bank multi-carrier (FBMC), non-orthogonal multiple access (NOMA), and sparse code multiple access (SCMA), which are advanced access techniques, are also being developed.

At the same time, the Internet has evolved from a human-centered connection network where humans create and consume information, to an Internet of Things (IoT) network where pieces of information are exchanged and processed among distributed components such as things. Internet of Everything (IoE) technology, in which big data processing technology through a connection to a cloud server and the like is combined with the IoT technology, is also emerging. In order to implement the IoT, technical components such as sensing technology, wired/wireless communication and network infrastructure, service interface technology, and security technology are required. Recently, a sensor network, machine-to-machine (M2M) communication, machine-type communication (MTC), and the like, for connection between things are being studied. In the IoT environment, intelligent Internet technology (IT) services that create new values in human life by collecting and analyzing data generated from connected things may also be provided. The IoT may be applied to fields such as smart homes, smart buildings, smart cities, smart cars or connected cars, smart grids, health care, smart home appliances, advanced medical services, and the like, through fusion and convergence of existing IT technology and various industries.

Accordingly, various attempts have been made to apply the 5G communication system to the IoT network. For example, technologies such as a sensor network, M2M communication, MTC, and the like, are being implemented by the 5G communication technologies such as beamforming, MIMO, array antennas, and so forth. The use of the cloud RAN as the above-mentioned big data processing technology is an example of the convergence of the 5G technology and the IoT technology.

As various services are provided based on the above description and according to the development of a mobile communication system, there is demand for a method to effectively provide services for supporting interworking of, particularly, the 5G system (5GS) and an evolved packet system (EPS).

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and method for supporting session continuity in a wireless communication system.

Additional aspects will be set forth in part in the description which follows and, in part, will be apparent from the description, or may be learned by practice of the presented embodiments of the disclosure.

In accordance with an aspect of the disclosure, a method performed by a user equipment (UE) in a wireless communication system is provided. The method includes transmitting, to an access and mobility function (AMF), a registration request message for moving to a first public land mobile network (PLMN) from a second PLMN, receiving, from the AMF, a registration accept message including first single-network slice selection assistance information (S-NSSAI) corresponding to the first PLMN of the AMF, determining whether second S-NSSAI associated with a protocol data unit (PDU) session established for the UE matches to the first S-NSSAI, wherein the second S-NSSAI corresponds to the second PLMN, and locally updating the PDU session based on a result of the determining.

In accordance with another aspect of the disclosure, the first S-NSSAI includes a first slice/service type (SST) of the first PLMN and a first mapped home PLMN (HPLMN) SST, the second S-NSSAI includes a second mapped HPLMN SST, and the locally updating of the PDU session based on the result of the determining comprises locally updating the second S-NSSAI associated with the PDU session to the first S-NSSAI corresponding to the first PLMN of the AMF based on the result of the determining.

In accordance with another aspect of the disclosure, the determining of whether the second S-NSSAI matches to the first S-NSSAI comprises determining whether the first mapped HPLMN SST and the second mapped HPLMN SST are the same.

In accordance with another aspect of the disclosure, the first S-NSSAI further includes a first slice differentiator (SD) of the first PLMN and a first mapped HPLMN SD, the second S-NSSAI further includes a second mapped HPLMN SD, and the determining of whether the second S-NSSAI matches to the first S-NSSAI further comprises determining whether the first mapped HPLMN SD and the second mapped HPLMN SD are the same.

In accordance with another aspect of the disclosure, the PDU session is used continuously and is not released by locally updating the second S-NSSAI to the first S-NSSAI based on the result of the determining.

In accordance with another aspect of the disclosure, a method performed by an AMF in a wireless communication system is provided. The method includes receiving, from a user equipment (UE), a registration request message for moving to a first PLMN from a second PLMN, and transmitting, to the UE, a registration accept message including first S-NSSAI corresponding to the first PLMN of the AMF, wherein second S-NSSAI associated with a PDU session established for the UE is locally updated to the first S-NSSAI based on determining whether the first S-NSSAI matches to the second S-NSSAI, and wherein the second S-NSSAI corresponds to the second PLMN.

In accordance with another aspect of the disclosure, the first S-NSSAI includes a first SST of the first PLMN and a first mapped HPLMN SST, and the second S-NSSAI includes a second mapped HPLMN SST.

In accordance with another aspect of the disclosure, the second S-NSSAI configured for the PDU session is locally updated to the first S-NSSAI in case that the first mapped HPLMN SST and the second mapped HPLMN SST are the same.

In accordance with another aspect of the disclosure, the first S-NSSAI further includes a first SD of the first PLMN and a first mapped HPLMN SD, wherein the second S-NSSAI further comprises a second mapped HPLMN SD, and wherein the second S-NSSAI configured for the PDU session is locally updated to the first S-NSSAI in case that the first mapped HPLMN SD and the second mapped HPLMN SD are the same.

In accordance with another aspect of the disclosure, the PDU session is used continuously and not released by local update of the second S-NSSAI to the first S-NSSAI based on the result of the determining.

In accordance with another aspect of the disclosure, a user equipment (UE) in a wireless communication system is provided. The UE includes a transceiver, and at least one processor operably connected with the transceiver and configured to transmit, to an AMF, by controlling the transceiver, a registration request message for moving to a first public land mobile network (PLMN) from a second PLMN, receive, from the AMF, by controlling the transceiver, a registration accept message including first S-NSSAI corresponding to the first PLMN of the AMF, determine whether second S-NSSAI associated with a PDU session established for the UE matches to the first S-NSSAI, wherein the second S-NSSAI corresponds to the second PLMN, and locally update the PDU session based on a result of the determining.

In accordance with another aspect of the disclosure, an AMF in a wireless communication system is provided. The AMF includes a transceiver, and at least one processor operably connected with the transceiver and configured to receive, from a UE, by controlling the transceiver, a registration request message for moving to a first public land mobile network (PLMN) from a second PLMN, and transmit, to the UE, by controlling the transceiver, a registration accept message including first S-NSSAI corresponding to the first PLMN of the AMF, wherein second S-NSSAI associated with a PDU session established for the UE is locally updated to the first S-NSSAI based on determining whether the first S-NSSAI matches to the second S-NSSAI, and wherein the second S-NSSAI corresponds to the second PLMN.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
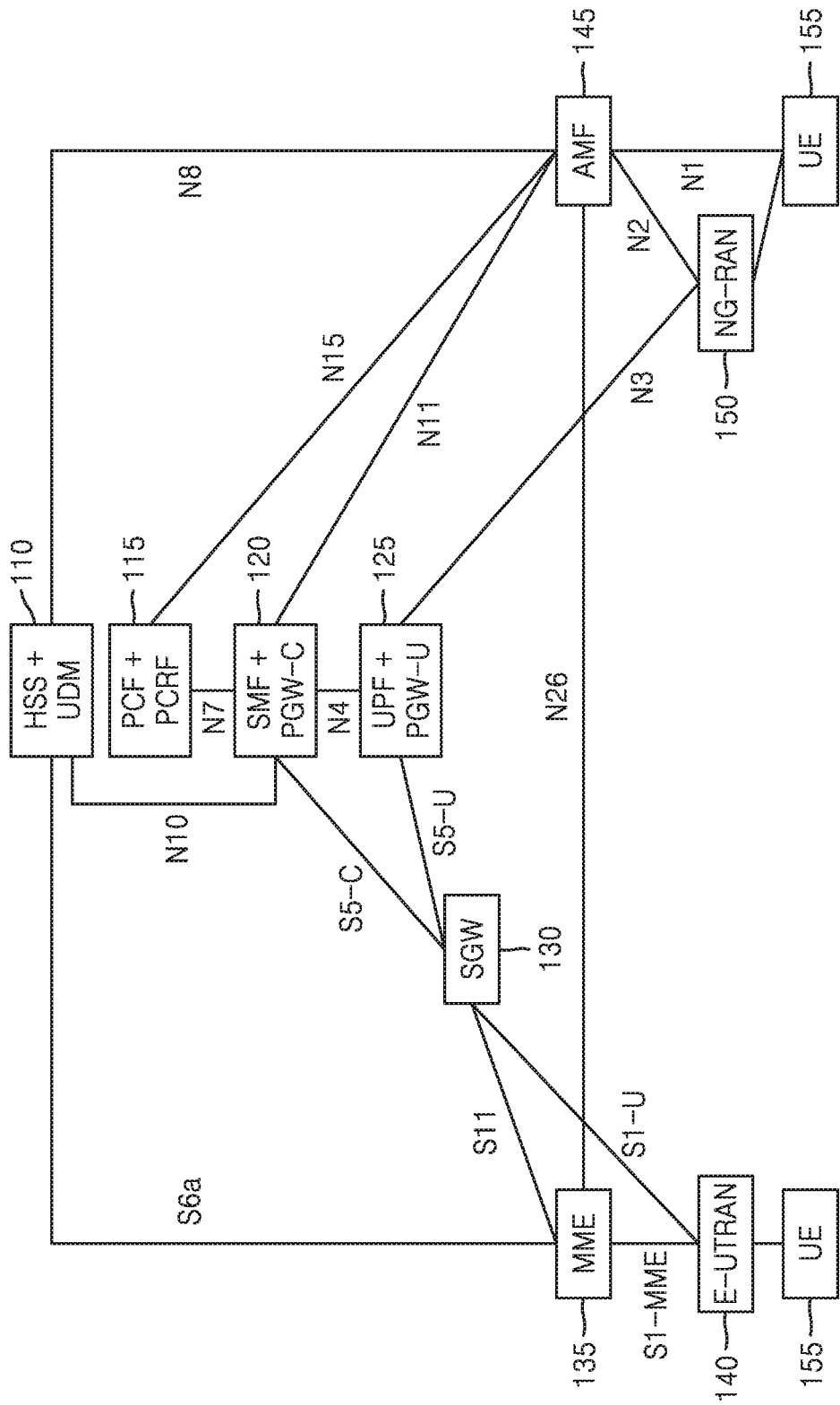
FIG. 1 illustrates an interworking architecture between a 5G system (5GS) and an evolved packet system (EPS) in a non-roaming situation, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular form "a," "an," and "the" include plural referents unless the context clearly dictates otherwise. Thus, for example, reference to "a component surface" includes reference to one or more of such surfaces. Unless defined otherwise, all terms used herein including technical or scientific terms have the same meanings as those generally understood by those of ordinary skill in the art to which the disclosure may pertain. The terms as those defined in generally used dictionaries are construed to have meanings matching that in the context of related technology and, unless clearly defined otherwise, are not construed to be ideally or excessively formal. In some cases, even the terms defined in the disclosure cannot be interpreted to exclude embodiments of the disclosure.

In the below-described various embodiments of the disclosure, a hardware-based access method is described as an example. However, as various embodiments of the disclosure include technologies using both hardware and software, various embodiments of the disclosure do not exclude a software-based access method.

In the following description, when detailed descriptions about related well-known functions or structures are determined to make the disclosure unclear, the detailed descriptions will be omitted. The terms used in the disclosure have been selected from currently widely used general terms in consideration of the functions in the disclosure. However, the terms may vary according to the intention of one of ordinary skill in the art, case precedents, and with the advent of new technologies. Accordingly, the terms used in the disclosure are defined based on their meanings in relation to the contents discussed throughout the specification, not by their simple meanings.

Further, each element illustrated in the drawings may be exaggerated, omitted, or schematically illustrated for convenience of explanation and clarity. The illustrated size of each element does not substantially reflect its actual size. In each drawing, like or corresponding elements are denoted by like reference numerals.

The advantages and features of the disclosure and a method to achieve them will be clarified with reference to the embodiments described in detail with the accompanying drawings. This disclosure may, however, be embodied in many different forms and should not be construed as limited to the embodiments set forth herein. Rather, these embodiments are provided so that this disclosure will be thorough and complete, and will fully convey the scope of the disclosure to one of ordinary skill in the art. Throughout the drawings, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor or at least one processor.

Throughout the specification, a layer (or a layer apparatus) may also be referred to as an entity.

It will be understood that blocks of flowcharts and combinations of flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Accordingly, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Further, the components and "units" may be embodied to reproduce one or more central processing units (CPUs) in a device or security multimedia card. As used herein, the "unit" may include at least one processor.

Hereinafter, the disclosure relates to an apparatus and method for providing a network slice in a wireless communication system. In detail, the disclosure describes technology to provide session mobility in a mobile communication network system which provides a network slice function in a wireless communication system.

Hereinafter, in the description, terms used to identify a node, terms referring to a signal, terms referring to a channel, terms referring to control information, terms referring to network entities, terms referring to a component of an apparatus, terms referring to messages, terms referring to an interface between network entities, terms referring to various pieces of identification information, and the like, are exemplified for convenience of description. Accordingly, the disclosure is not limited to the below-mentioned terms, and other terms having the same technical meaning may be used therefor.

Further, although the disclosure describes various embodiments by using terms used in some communication protocols, for example, the 3rd Generation Partnership Project (3GPP), this is merely for convenience of explanation. Various embodiments of the disclosure may be applied to other communication systems by being easily modified.

As a post-long term evolution (LTE) future communication system, the 5G communication system supports a service to simultaneously satisfy various requirements because various requirements by users and service providers are freely reflected. Services considered for the 5G communication system include enhanced mobile broadband (eMBB), massive machine-type communication (mMTC), and ultra-reliability and low-latency communication (URLLC).

According to an embodiment, the eMBB may have a goal of providing an enhanced data rate faster than the data rate supported by the existing LTE, LTE-advanced (LTE-A), or LTE-A pro (LTE-Pro). For example, in the 5G communication system, the eMBB may provide, in view of one base station, a peak data rate of about 20 Gbps for downlinks and a peak data rate of about 10 Gbps for uplinks. Further, the 5G communication system may provide a peak data rate and simultaneously an increased user perceived data rate of a UE. To satisfy the requirements in the 5G communication system may require an improvement of various transmission/reception technologies including an enhanced multi-input multi-output (MIMO) transmission technology. Further, while the current LTE transmits signals using a maximum 20 MHz transmission bandwidth in a 2 GHz band, in the 5G communication system, a frequency bandwidth of 20 MHz or more is used in a frequency band of 3 to 6 GHz or 6 GHz or more, and thus the data rate required in the 5G communication system may be satisfied.

Simultaneously, in the 5G communication system, the mMTC is considered to support applied services such as the Internet of Things (IoT). In order to efficiently provide the IoT, the mMTC may be required to support an access by a large number of UEs within a cell, improve a UE coverage, improve battery life, and reduce UE costs. The IoT, which is attached to various sensors and various devices and provides a communication function, is able to support a large number of UEs, for example, 1,000,000 UEs/km$^2$, in the cell.

Further, as the UE supporting the mMTC is highly likely to be located in a shaded area that the cell cannot cover, such as the basement of a building, due to the characteristics of the service, a wider coverage may be required compared to other services provided in the 5G communication system. A UE supporting the mMTC is configured with a low-cost UE, and as it is difficult to frequently exchange the battery of a UE, a battery life time such as 10 to 15 years may be required.

Finally, the URLLC, as a cellular-based wireless communication service used for a specific purpose (mission-critical), may be used for services used for remote control for a robot or a machinery, industrial automation, unmanned aerial vehicles, remote health care, emergency alerts, and so forth. Accordingly, communication provided by the URLLC may have very low low-latency (ultra-low latency) and very high reliability (super reliability). For example, a service supporting the URLLC may satisfy an air interface latency of less than 0.5 milliseconds and simultaneously have a requirement of a packet error rate of $10^{-5}$ or less. Accordingly, for services that support the URLLC, the 5G system may be asked for design factors of providing a smaller transmit time interval (TTI) than other services and simultaneously allocating a wide resource in a frequency band to secure the reliability of a communication link.

The three services considered in the above-described 5G communication system, that is, the eMBB, the URLLC, and the mMTC, may be multiplexed and transmitted in one system. At this time, in order to satisfy different requirements of the respective services, different transmission/reception techniques and transmission/reception parameters may be used among the services. However, the above-described mMTC, URLLC, and eMBB are only examples of different service types, and service types to which the disclosure is applied are not limited to the above-described examples.

Further, in the following description, an embodiment of the disclosure is described with an example of an LTE, LTE-A, LTE Pro or 5G (or next generation mobile communication (NR)) system, but the embodiment of the disclosure may also be applied to other communication systems having similar technical backgrounds or channel types. Still further, the embodiment of the disclosure may be applied to other communication systems through some modifications thereof without departing from the scope of the disclosure based on the determination of a person of skill in the art.

In a 3GPP standard, 5G network system architecture and procedure are standardized. Mobile communication operators may provide various services in a 5G network. In order to provide each service, the mobile communication operator needs to satisfy different service requirements for each service, for example, latency, a communication range, a data rate, a bandwidth, reliability, and so forth. To this end, the mobile communication operator may configure a network slice and allocate network resources suitable for a specific service for each network slice or for each set of network slices. The network resource may mean an NF (network function) or a logical resource provided by the NF or radio resource allocation of a base station.

For example, the mobile communication operator may configure a network slice A to provide a mobile broadband service, configure a network slice B to provide a vehicle communication service, and configure a network slice C to provide an IoT service. That is, in the 5G network, a corresponding service may be provided on a network slice specialized for the characteristics of each service. Single-network slice selection assistance information (S-NSSAI)

defined in the 3GPP may be used as a differentiator for differentiating (or, identifying) network slices. One piece of S-NSSAI may be configured with a SST used in a home public land mobile network (PLMN) (HPLMN), a SD used in the HPLMN, the SST used in a visited PLMN (VPLMN), and the SD used in the VPLMN. Each SST and SD constituting one piece of the S-NSSAI may or may not have a value depending on the situation.

The mobile communication operator may operate the 5G network and evolved packet system (EPS) (or called LTE) network together. A mobile communication UE may access the 5G network to use services and then move to the EPS network. Alternatively, the mobile communication UE may access the EPS network to use services and then move to the 5G network.

Figure 2:
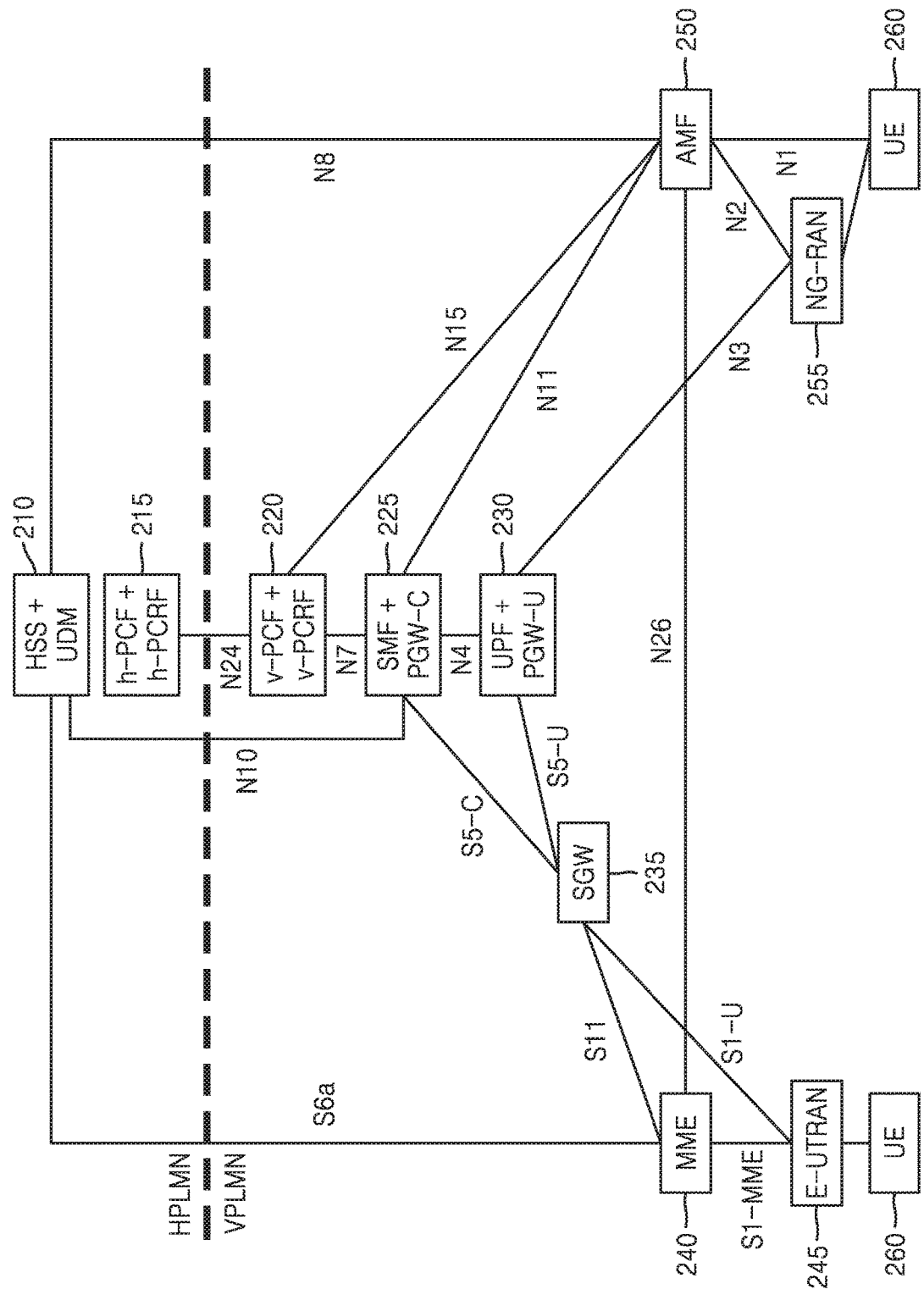
FIG. 2 illustrates an interworking architecture between a 5GS and an EPS in a local breakout roaming situation, according to an embodiment of the disclosure.
Figure 3:
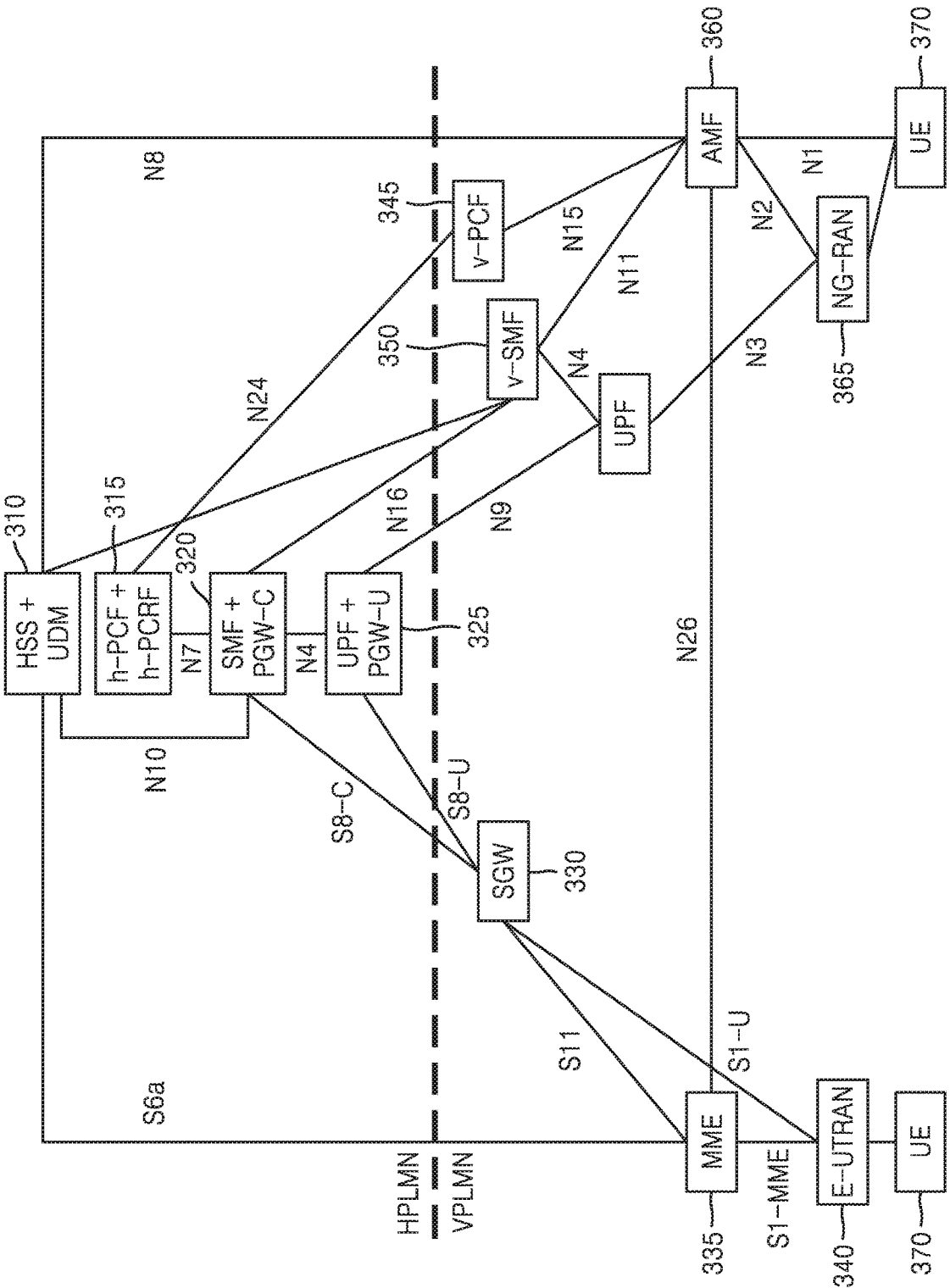
FIG. 3 illustrates an interworking architecture between a 5GS and an EPS in a home-routed roaming situation, according to an embodiment of the disclosure.

In the disclosure, an interworking method between a 5G network system architecture for providing a network slice function and an EPS network system is defined. FIGS. 1, 2, and 3 illustrate interworking architectures between a 5G system (5GS) and an EPS. The terms N1, N2 . . . , and so forth, shown around the line connecting each entity refer to communication interfaces.

Further, a network operation and a UE operation are defined so that a UE using a communication service by establishing a session connection in the EPS may use the service seamlessly even when moving to the 5GS.

FIG. 1 illustrates an interworking architecture between a 5GS and an EPS in a non-roaming situation, according to an embodiment of the disclosure.

Referring to FIG. 1, the 5GS may include a NR base station, as referred to as a next generation radio access network (NG-RAN) 150, an access and mobility management function (AMF) 145, a session management function (SMF) of 120, a user plane function (UPF) of 125, a policy control function (PCF) of 115, and a unified data management (UDM) of 110. The EPS may include an E-UTRA base station (E-UTRAN) 140, a mobility management entity (MME) 135, a serving gateway (SGW) 130, a packet gateway-user plane (PGW-U) of 125, a packet gateway-control plane (PGW-C) of 120, a policy and charging rules function (PCRF) of 115, and a home subscriber server (HSS) of 110.

The UDM of 110 of the 5GS and the HSS of 110 of the EPS may be provided as one combo node. The SMF of 120 of the 5GS and the PGW-C of 120 of the EPS may also be provided as one combo node. A node of the UDM+the HSS of 110 may store subscriber information of a UE. The UPF of 125 of the 5GS and the PGW-U of 125 of the EPS may be provided as one combo node. A UE 155 may access the MME 135 of the EPS via the E-UTRA base station 140 and use EPS network services. Further, the UE 155 may access the AMF 145 of the 5GS via the NR base station 150 and use 5GS network services.

FIG. 2 illustrates an interworking architecture between a 5GS and an EPS in a local breakout roaming situation, according to an embodiment of the disclosure.

Referring to FIG. 2, a UE 260 may access an MME 240 of the EPS via an E-UTRA base station 245 and use the EPS network services. Further, the UE 260 may access an AMF 250 of the 5GS via an NR base station 255 and use the 5GS network services. In the interworking architecture between the 5GS and the EPS in local breakout roaming, a node of a SMF+PGW-C 225 may be located in the VPLMN. FIG. 2 is divided into an HPLMN and a VPLMN. In FIG. 2, the PCF+PCRF 115 of FIG. 1 is divided into an h-PCF+h-PCRF 215 in the HPLMN and a v-PCF+v-PCRF 220 in the VPLMN. Remaining features 210, 225, 230, and 235, correspond to features of FIG. 1 and therefore, further descriptions are omitted.

FIG. 3 illustrates an interworking architecture between a 5GS and an EPS in a home-routed roaming situation, according to an embodiment of the disclosure.

Referring to FIG. 3, a UE 370 may access an MME 335 of the EPS via an E-UTRA base station (E-UTRAN) 340 and use the EPS network services. Further, the UE 370 may access an AMF 360 of the 5GS via an NR base station 365 and use the 5GS network services. In the interworking architecture between the 5GS and the EPS in a home-routed roaming, a node of a SMF+PGW-C 320 may be located in the HPLMN. FIG. 3 is divided into an HPLMN and a VPLMN. In FIG. 3, the PCF+PCRF 115 of FIG. 1 is divided into an h-PCF+h-PCRF 315 in the HPLMN and a v-PCF 345 in the VPLMN. A v-SMF 350 and a UPF are in the VPLMN. Remaining features 310, 325, and 330, correspond to features of FIG. 1 and therefore, further descriptions are omitted.

A mobile communication system according to an embodiment of the disclosure may support interworking between the 5GS and the EPS. For example, the UE that accesses an EPS system and generates a public data network or packet data network (PDN) connection (PDN connection) may move or hand over to the 5GS and continuously use the PDN connection generated in the EPS in the 5GS as a protocol data unit (PDU) session.

In detail, the SMF+PGW-C 120, 225, or 320 that received a PDN connectivity request message transmitted by the UE having accessed the EPS system may select S-NSSAI for the PDN connection requested by the UE. The SMF+PGW-C 120, 225, or 320 may transmit to the UE by including the selected S-NS SAI information as protocol configuration options (PCO) in a PDN connectivity response message transmitted to the UE. The UE having received the PDN connectivity response message establishes a PDN connection in the EPS and use the services. After moving to the 5GS, the UE may continuously use the PDN connection generated in the EPS as a PDU session in the 5GS, by using the S-NSSAI received from the SMF+PGW-C 120, 225, or 320 of the EPS in the form of PCO. In the above-described embodiments, the EPS may be referred to as the source PLMN, and the 5GS may be referred to as the target PLMN.

Further, the 5G mobile communication system may support inter-PLMN mobility. For example, a UE that has registered with a PLMN A and generated a PDU session may hand over to a PLMN B and continuously use the PDU session.

In detail, the UE having accessed a 5GS system of the PLMN A may determine S-NSSAI to be used in a PDU session based on a UE route selection policy (URSP) information stored in the UE to make a PDU session establishment. The UE may transmit to the SMF of 120 a PDU session establishment request message including the selected S-NSSAI. The SMF of 120 having received the PDU session establishment request message may store the S-NSSAI included in the request message and transmit to the UE a PDU session establishment response. The UE having received the PDU session establishment response message may establish a PDU session in the 5GS of the PLMN A and use services. After moving to the 5GS of the PLMN B, the UE may continuously use the PDU session generated in the 5GS of the PLMN A in the 5GS of the PLMN B. By continuously using the PDU session, when the UE moves from a source PLMN to a target PLMN, a procedure of releasing an established PDU session may not be performed. In addition, by continuously using the PDU session, when the UE moves from the source PLMN to the target PLMN, a procedure of establishing a new PDU session different from the established PDU session may not be performed. That is, by updating the context of the established PDU session (e.g., S-NSSAI update) according to an embodiment of the disclosure, when the UE moves from the source PLMN to the target PLMN, the PDU session release and/or establishment procedure may be omitted. In the above-described embodiment, the 5GS of the PLMN A may be referred to as the source PLMN, and the 5GS of the PLMN B may be referred to as the target PLMN.

Figure 4:
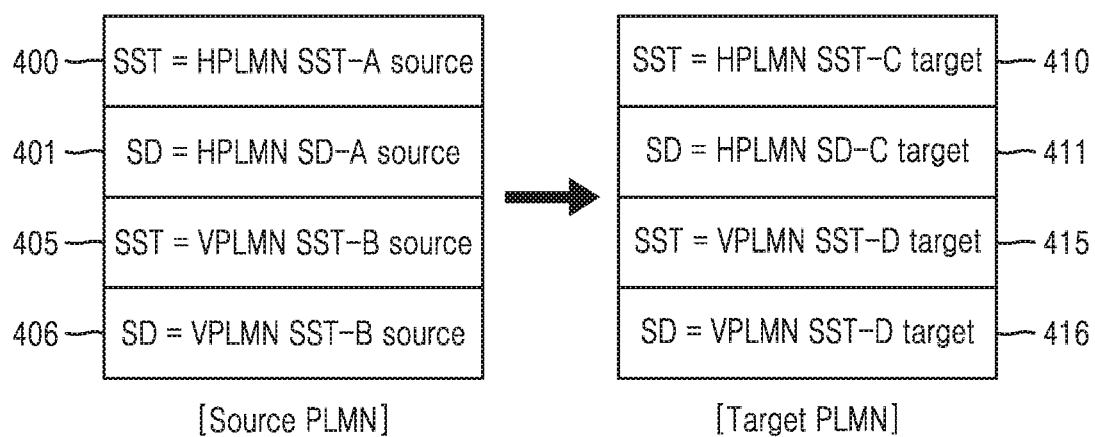
FIG. 4 illustrates examples of information received by a user equipment (UE) from a source public land mobile network (PLMN) and information received by the UE from a target PLMN, according to an embodiment of the disclosure.

FIG. 4 illustrates examples of information received by a UE from a source PLMN and information received by a UE from a target PLMN, according to an embodiment of the disclosure.

Referring to FIG. 4, a UE may store S-NSSAI information for a PDN connection or a PDU session generated from the source PLMN. The UE may store the S-NSSAI as context information of the PDN connection or the PDU session. The S-NSSAI may include at least one of values used in an SST 400 used in the HPLMN, an SD 401 used in the HPLMN, an SST 405 used in the VPLMN, or an SD 406 used in the VPLMN. When the UE generates a PDN connection in the EPC, the S-NSSAI may be S-NSSAI information received from the SMF+PGW-C 120, 225, or 320 in the form of PCO. Alternatively, when the UE generates a PDU session in the 5GS, the S-NSSAI may be S-NSSAI information selected by the UE based on the URSP stored in the UE.

After moving to the target PLMN, the UE may receive from the target PLMN S-NSSAI to continuously move from PDN connection to PDU session by using the procedure illustrated in FIGS. 5A to 8. The S-NSSAI received by UE from the target PLMN may include at least one of values of an SST 410 used in the HPLMN, an SD 411 used in the HPLMN, an SST 415 used in the VPLMN, or an SD 416 used in the VPLMN.

The UE may store the S-NSSAI information received from the target PLMN and update the context of the PDU session stored in the UE. For example, the UE may change the SST 400 used in the HPLMN to the SST 410 used in the HPLMN which is received from the target PLMN. Further, the UE may change the SD 401 used in the HPLMN to the SD 411 used in the HPLMN which is received from the target PLMN. Still further, the UE may change the SST 405 used in the VPLMN to the SST 415 used in the VPLMN which is received from the target PLMN. Still further, the UE may change the SD 406 used in the VPLMN to the SD 416 used in the VPLMN which is received from the target PLMN. When the UE does not receive from the target PLMN at least one piece of information about the SST 410 used in the HPLMN, the SD 411 used in the HPLMN, the SST 415 used in the VPLMN, or the SD 416 used in the VPLMN, the UE may use, without change, at least one piece of information about the SST 400 used in the HPLMN, the SD 401 used in the HPLMN, the SST 405 used in the VPLMN, or the SD 406 used in the VPLMN, which are stored as the context of the PDU session in the source PLMN, or may configure a field of the information that is not received from the target PLMN as empty.

Figure 5A:
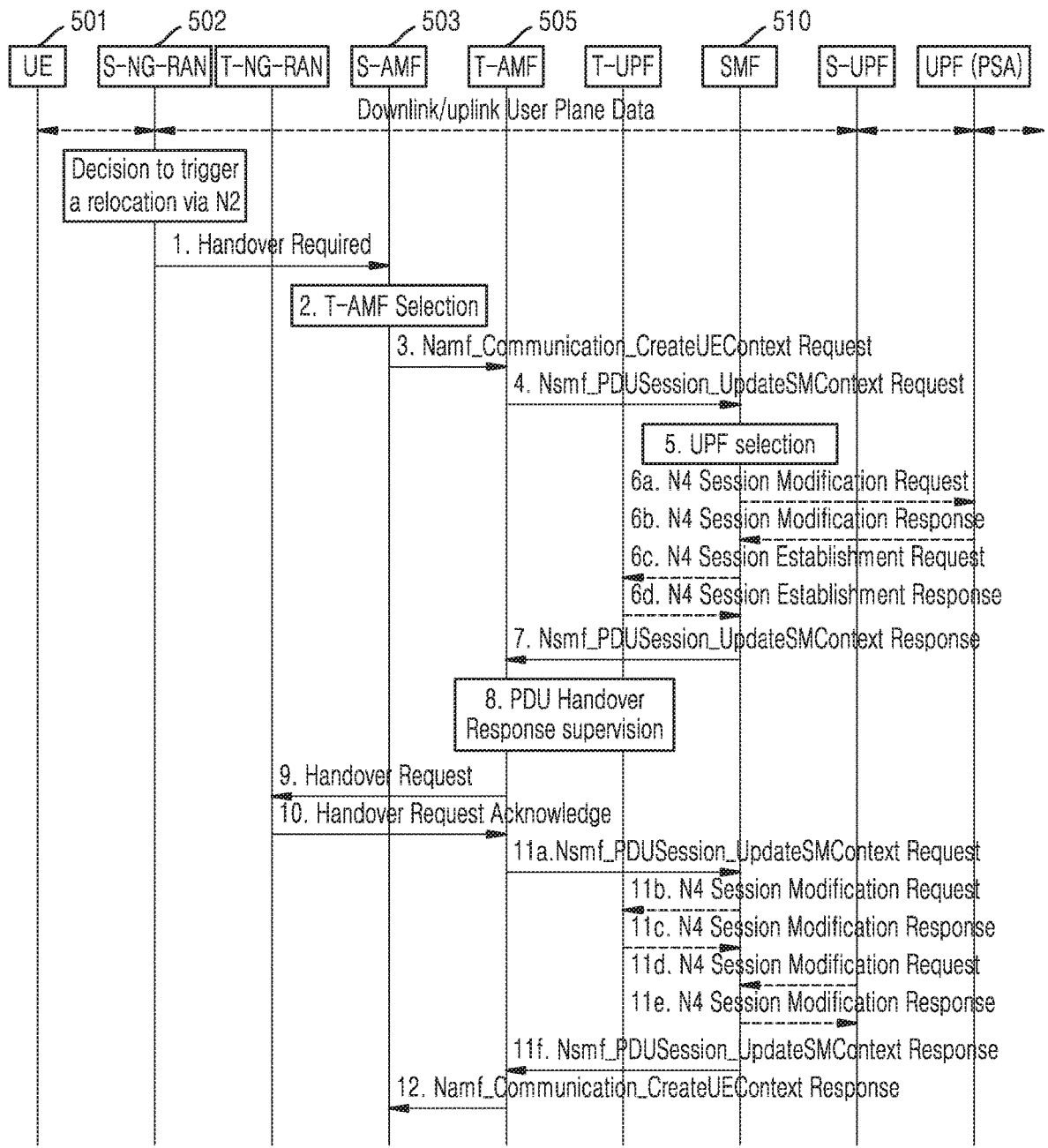
FIG. 5A illustrates a handover procedure from a source PLMN to a target PLMN, performed by a UE, according to an embodiment of the disclosure.
Figure 5B:
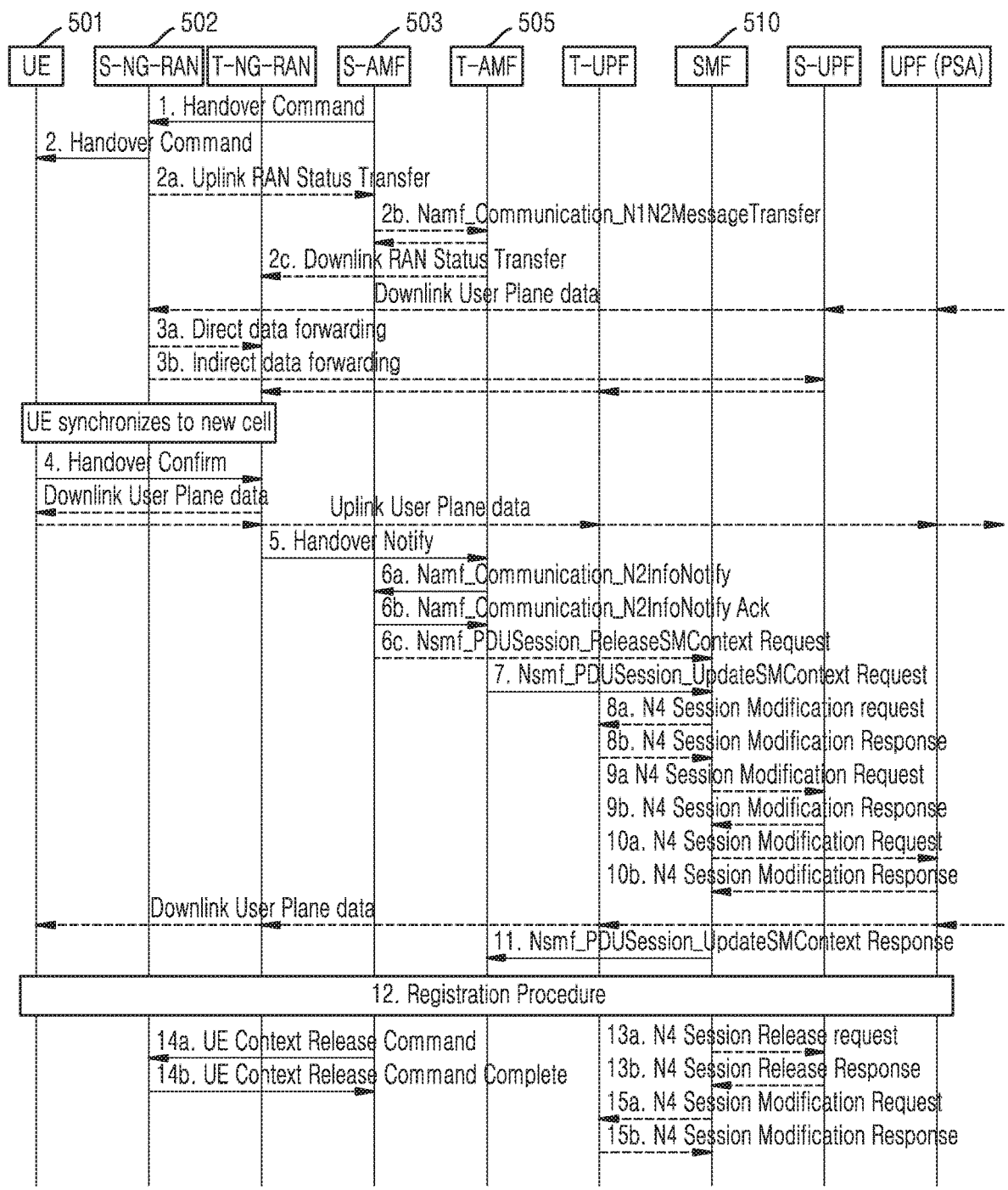
FIG. 5B illustrates a handover procedure from a source PLMN to a target PLMN, performed by a UE, according to an embodiment of the disclosure.

FIGS. 5A and 5B illustrate a handover procedure from a source PLMN to a target PLMN, performed by a UE, according to various embodiments of the disclosure.

Referring to FIG. 5A, an Nsmf_PDUSession_UpdateSM-Context Response message in operation 7 that an SMF 510 transmits to a target-AMF (T-AMF) 505 may include S-NSSAI information for a PDU session. The S-NSSAI informa-tion may include at least one piece of information about the SST 410 used in the HPLMN, the SD 411 used in the HPLMN, the SST 415 used in the VPLMN, or the SD 416 used in the VPLMN. The T-AMF 505 that received the S-NSSAI information for a PDU session from the SMF 510 may store the received S-NSSAI information and/or PDU session information related to the S-NSSAI information.

A Namf_Communication_CreateUEContext Response message in operation 12 transmitted by the T-AMF 505 to a source-AMF (S-AMF) 503 may include the S-NSSAI and/or the PDU session information that the T-AMF 505 received in operation 7 from the SMF 510. The S-AMF 503 that received the S-NSSAI information for a PDU session from the T-AMF 505 may store the received S-NSSAI information and/or PDU session information related to the S-NSSAI information.

Referring to FIG. 5B, the Handover Command messages in operations 1 and 2 that the S-AMF 503 transmits to a UE 501 via a source-NG-RAN (S-NG-RAN) 502 may include the S-NSSAI and/or the PDU session information that the S-AMF 503 received from the T-AMF 505 through the procedure illustrated in FIG. 5A. The UE 501 that received the S-NSSAI information for a PDU session from the S-AMF 503 may store the received S-NSSAI information and/or PDU session information related to the S-NSSAI information and update the relevant PDU session context. Operations 1, 2, 3, 4, 5, 6a, 6b, 6c, 6d, 8, 9, 10, 11a, 11b, 11c, 11d, 11e, and 11f of FIG. 5A are described as shown in the drawing, and further descriptions are omitted. Operations 2a, 2b, 2c, 3a, 4, 5, 6a, 6b, 6c, 7, 8a, 8b, 9a, 9b, 10a, 10b, 11, 12, 13a, 13b, 14a, 14b, 15a, and 15b of FIG. 5B are described as shown in the drawing, and further descriptions are omitted.

Figure 6:
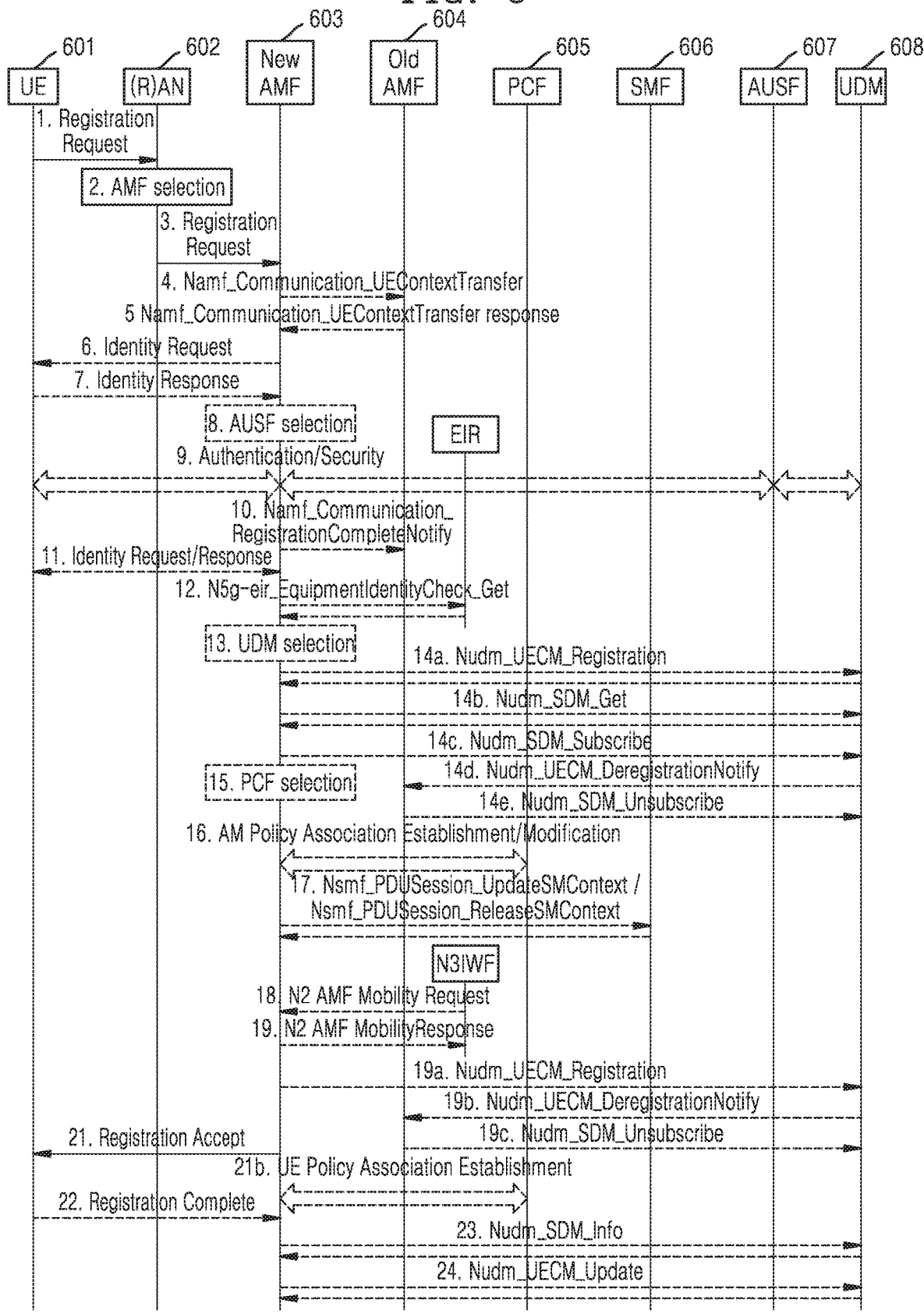
FIG. 6 illustrates a procedure for registration with a target PLMN when a UE moves from a source PLMN to the target PLMN, according to an embodiment of the disclosure.

FIG. 6 illustrates a procedure of registration with a target PLMN when a UE moves from a source PLMN to the target PLMN, according to an embodiment of the disclosure.

Referring to FIG. 6, A UE 601 may transmit a registration request message to a new AMF 603 in operations 1-3. The UE 601 may transmit, to the new AMF 603, the registration request message for moving to a target PLMN from a source PLMN. The UE 601 may transmit the registration request message to the new AMF 603 via an (R)AN. An Nsmf_P-DUSession_UpdateSMContext to Nsmf_PDUSession_Re-leaseSMContext message in operation 17 that an SMF 606 transmits to a new AMF 603, relative to an old AMF 604, may include S-NSSAI information for a PDU session. The S-NSSAI information may include at least one piece of information about the SST 410 used in the HPLMN, the SD 411 used in the HPLMN, the SST 415 used in the VPLMN, or the SD 416 used in the VPLMN. The new AMF 603 that received the S-NSSAI information for a PDU session from the SMF 606 may store the received S-NSSAI information and/or PDU session information related to the S-NSSAI information. A PCF 605, authentication server function (AUSF) 607, and UDM 608 are shown, but not described further.

A Registration Accept message in operation 21 that the new AMF 603 transmits to a UE 601 via an (R)AN 602 may include the S-NSSAI and/or PDU session information that the new AMF 603 received from the SMF 606. The UE 601 that received the S-NSSAI information for a PDU session from the new AMF 603 may store the received S-NSSAI information and/or PDU session information related to the S-NSSAI information and locally update the relevant PDU session context. For example, the UE 601 may determine whether S-NSSAI associated with a PDU session, which is established for the UE 601 and not yet updated, matches to the received S-NSSAI for a PDU session received from the AMF 603, and may update the established PDU session based on a result of the determining. Operations 1, 2, 3, 4, 5, 6, 7, 8, 9, 10, 11, 12, 13, 14a, 14b, 14c, 14d, 14e, 15, 16, 18, 19, 19a, 19b, 19c, 21b, 22, 23 and 24 of FIG. 6 are described as shown in the drawing, and further descriptions are omitted.

Figure 7:
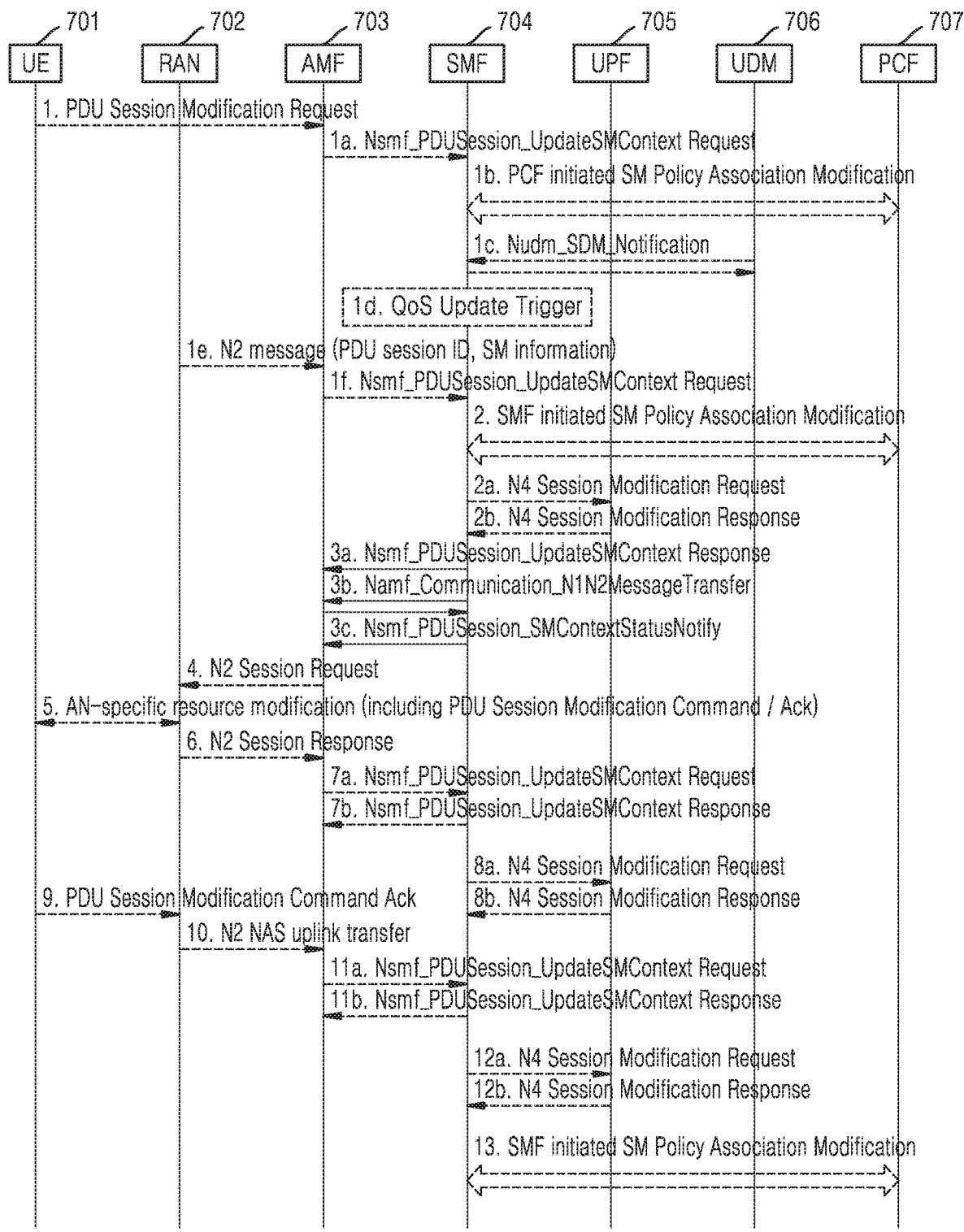
FIG. 7 illustrates a Protocol Data Unit (PDU) session modification procedure to enable a UE, after having moved from a source PLMN to a target PLMN, to continuously use a PDU session in the target PLMN, according to an embodiment of the disclosure.

FIG. 7 illustrates a PDU session modification procedure to enable a UE, after having moved from a source PLMN to a target PLMN, to continuously use a PDU session in the target PLMN, according to an embodiment of the disclosure.

Referring to FIG. 7, an Nsmf_PDUSession_UpdateSM-Context message in operation 3a, a Namf_Communication_N1N2MessageTransfer message in operation 3b, and a Nsmf_PDUSessionSMContextStatus-Notify message in operation 3c, which an SMF 704 transmits to an AMF 703, may include S-NSSAI information for a PDU session. The S-NSSAI information may include at least one piece of information about the SST 410 used in the HPLMN, the SD 411 used in the HPLMN, the SST 415 used in the VPLMN, or the SD 416 used in the VPLMN. The AMF 703 that received the S-NSSAI information for a PDU session from the SMF 704 may store the received S-NSSAI information and/or PDU session information related to the S-NSSAI information. A PCF 707, UDM 706, and UPF 705 are shown, but not described further.

An N2 Session Request message in operation 4 and an AN-specific resource modification message in operation 5 that the AMF 703 transmits to a UE 701 via a RAN 702 may include the S-NSSAI and/or PDU session information that the AMF 703 received from the SMF 704. The UE 701 that received the S-NSSAI information for a PDU session from the AMF 703 may store the received S-NSSAI information and/or PDU session information related to the S-NSSAI information and update the relevant PDU session context. Operations 1, 1a, 1b, 1c, 1d, 1e, 1f, 2, 2a, 2b, 6, 7a, 7b, 8a, 8b, 9, 10, 11a, 11b, 12a, 12b, and 13 of FIG. 7 are described as shown in the drawing, and further descriptions are omitted.

Figure 8:
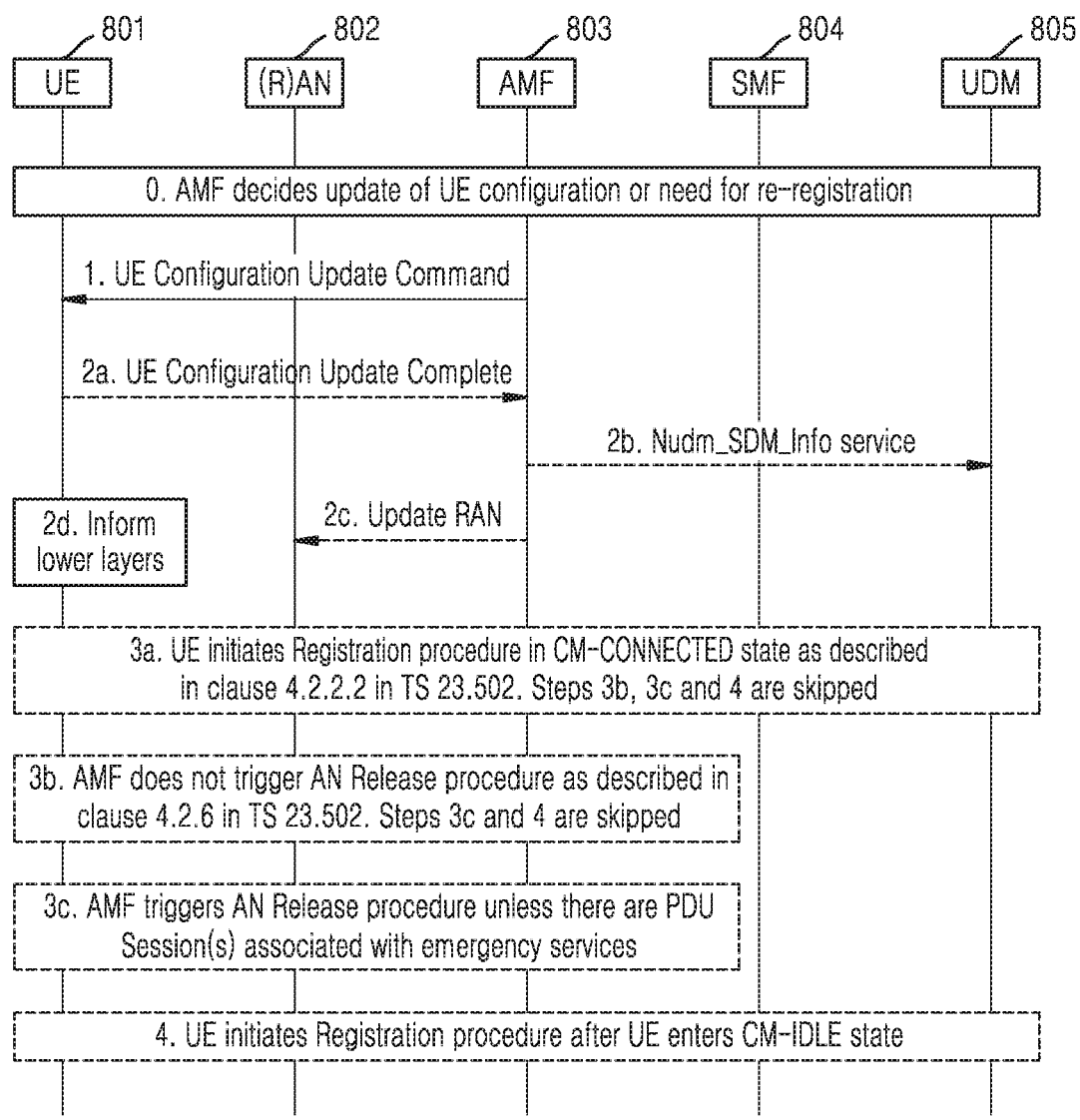
FIG. 8 illustrates a UE configuration update procedure for a UE, after having moved from a source PLMN to a target PLMN, to continuously use a PDU session in the target PLMN, according to an embodiment of the disclosure.

FIG. 8 illustrates a UE configuration update procedure for a UE, after having moved from a source PLMN to a target PLMN, to continuously use a PDU session in the target PLMN, according to an embodiment of the disclosure.

Referring to FIG. 8, an SMF 804 may trigger, in operation 0, to an AMF 803 the UE configuration update procedure. The SMF 804 may transmit to the AMF 803 the S-NSSAI information for a PDU session and/or PDU session information. The S-NSSAI information may include at least one piece of information about the SST 410 used in the HPLMN, the SD 411 used in the HPLMN, the SST 415 used in the VPLMN, or the SD 416 used in the VPLMN. The AMF 803 that received the S-NSSAI information for a PDU session from the SMF 804 may store the received S-NSSAI information and/or PDU session information related to the S-NSSAI information. A UDM 805 is shown, but not described further.

A UE Configuration Update Command message in operation 1 that the AMF 803 transmits to a UE 801 via an (R)AN 802 may include the S-NSSAI and/or PDU session information that the AMF 803 received from the SMF 804. The UE 801 that received the S-NSSAI information for a PDU session from the AMF 803 may store the received S-NSSAI information and/or PDU session information related to the S-NSSAI information and update the relevant PDU session context. Operations 2a, 2b, 2c, 2d, 3a, 3b, 3c, and 4 of FIG. 8 are described as shown in the drawing, and further descriptions are omitted.

The UE according to an embodiment of the disclosure may receive a Registration Accept message in operation 21 of FIG. 6 through the procedure illustrated in FIG. 6. The Registration Accept message may include Allowed NSSAI and/or Mapping of Allowed NSSAI information that the UE may use in a corresponding PLMN. The Allowed NSSAI may include one or more pieces of S-NSSAI that the UE may use in the PLMN and is provided by a serving PLMN. The Mapping of Allowed NSSAI may include one or more S-NSSAI that the UE may use in the PLMN and is provided by the serving PLMN and S-NSSAI information of the HPLMN that is mapped to each S-NSSAI. Examples of the Allowed NSSAI and the Mapping of Allowed NSSAI are presented below.

{(HPLMN SST-A, HPLMN SD-A), (VPLMN SST-E, VPLMN SD-E)},

{(HPLMN SST-C, HPLMN SD-C), (VPLMN SST-D, VPLMN SD-D)},

{(HPLMN SST-F, HPLMN SD-F), (VPLMN SST-G, VPLMN SD-G)}

In a detailed description of the above-described examples, the UE may access the serving PLMN and use three slices provided by the serving PLMN, that is, (VPLMN SST-E, VPLMN SD-E), (VPLMN SST-D, VPLMN SD-D), and (VPLMN SST-G, VPLMN SD-G). Slices of each VPLMN may be mapped to (HPLMN SST-A, HPLMN SD-A), (HPLMN SST-C, HPLMN SD-C), and (HPLMN SST-F, HPLMN SD-F).

The UE having received the Allowed NS SAI and the Mapping of Allowed NSSAI may compare the information in the source PLMN of FIG. 4 with the above-described Allowed NSSAI and Mapping of Allowed NSSAI information and produce available slice information for a PDU session in the target PLMN. For example, referring to FIG. 4, the UE may compare the SST 400 used in the HPLMN and/or the SD 401 used in the HPLMN that the UE stores with the SST value used in the HPLMN and/or SD values used in the HPLMN received in operation 21 of FIG. 6. For example, {(HPLMN SST-A, HPLMN SD-A), (VPLMN SST-E, VPLMN SD-E)} that is a value of the Allowed NSSAI including HPLMN SST-A and HPLMN SD-A that are respectively a value of the SST 400 used in the HPLMN and a value of the SD 401 used in the HPLMN, which are stored in the UE, may be determined. The UE may determine the value of the VPLMN S-NSSAI mapped to the HPLMN S-NSSAI of the above-described Allowed NSSAI, that is, the VPLMN SST-E and VPLMN SD-E, as values of the SST 415 used in the target PLMN and the SD 416 used in the target PLMN and update the relevant PDU session context. The updating of the relevant PDU session context may mean the determining the value of the VPLMN S-NSSAI mapped to the HPLMN S-NSSAI of the above-described Allowed NSSAI, that is, the VPLMN SST-E and VPLMN SD-E, as values of the SST 415 used in the target PLMN and the SD 416 used in the target PLMN.

Figure 9:
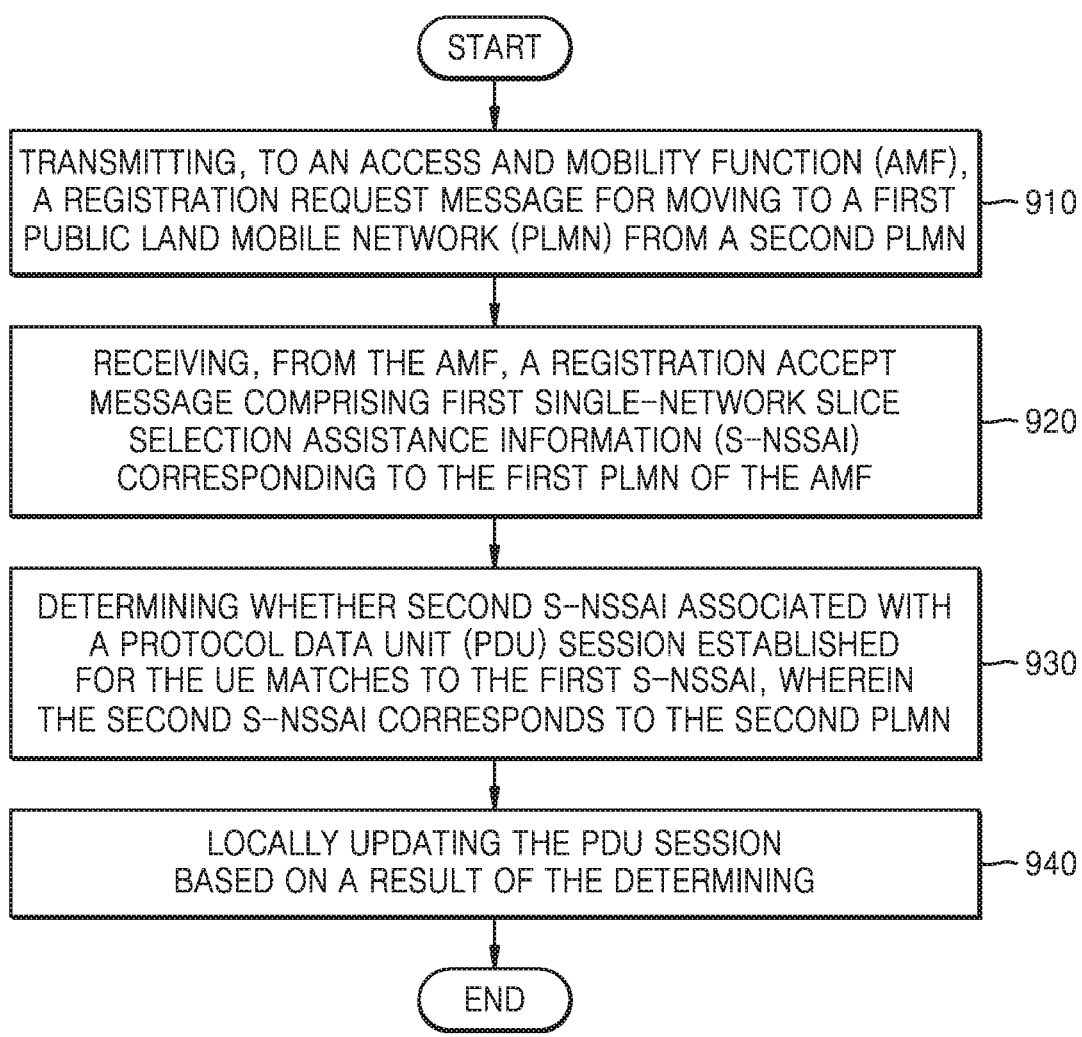
FIG. 9 illustrates a method for a UE to provide session continuity, according to an embodiment of the disclosure.

FIG. 9 illustrates a method for a UE to provide session continuity, according to an embodiment of the disclosure.

Referring to FIG. 9, in operation 910, the UE may transmit, to an access and mobility function (AMF), a registration request message for moving to a first public land mobile network (PLMN) from a second PLMN.

In operation 920, the UE may receive, from the AMF, a registration accept message comprising first single-network slice selection assistance information (S-NSSAI) corresponding to the first PLMN of the AMF.

In operation 930, the UE may compare second S-NSSAI associated with a protocol data unit (PDU) session established for the UE with the first S-NSSAI, wherein the second S-NSSAI corresponds to the second PLMN.

In operation 940, the UE may locally update the PDU session based on a result of the comparing.

Figure 10:
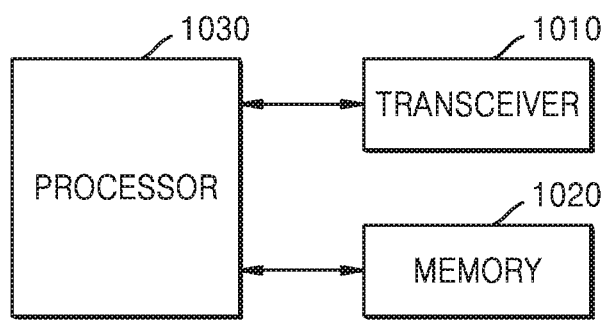
FIG. 10 illustrates a configuration of a UE, according to an embodiment of the disclosure.

FIG. 10 illustrates a configuration of a UE, according to an embodiment of the disclosure.

Referring to FIG. 10, a UE of the disclosure may include a transceiver 1010, a memory 1020, and a processor 1030. The processor 1030, the transceiver 1010, and the memory 1020 of the UE may operate according to the above-described communication method of the UE. However, constituent elements of the UE are not limited to the above-description. For example, the UE may include constituent elements more or less than the above-described constituent elements. In addition, the processor 1030, the transceiver 1010, and the memory 1020 may be implemented in the form of one chip. Further, the processor 1030 may include at least one processor.

The transceiver 1010, which collectively refers to a receiver of the UE and a transmitter of the UE, may transceive signals with a base station. The signal transceived with the base station may include control information and data. To this end, the transceiver 1010 may include an RF transmitter for up converting and amplifying the frequency of transmitted signals and an RF receiver for low noise amplifying received signal and down converting frequencies thereof. However, this is merely one embodiment of the transceiver 1010, and the constituent elements of the transceiver 1010 are not limited to the RF transmitter and the RF receiver.

Further, the transceiver 1010 may receive signals through a wireless channel and output the signals to the processor 1030, and transmit the signals output from the processor 1030 through the wireless channel.

The memory 1020 may store programs and data needed for the operation of the UE. Further, the memory 1020 may store control information or data included in the signals obtained by the UE. The memory 1020 may include storage media such as ROM, RAM, hard disks, CD-ROMs, and DVDs, or a combination thereof.

The processor 1030 may control a series of processes so that the UE operates according to the above-described embodiment of the disclosure. For example, the processor 1030 may receive control signals and data signals through the transceiver 1010 and process the received control signals and data signals. Further, the processor 1030 may transmit the processed control signal and data signal to the transceiver 1010.

Figure 11:
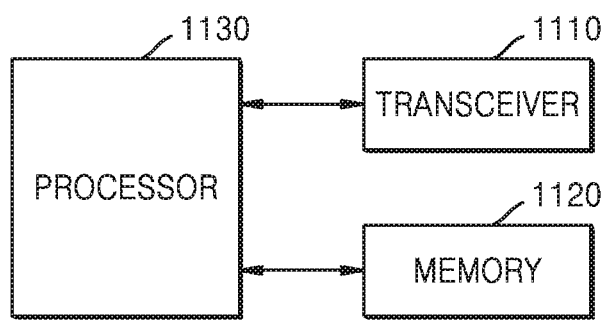
FIG. 11 illustrates a configuration of a network entity, according to an embodiment of the disclosure.

FIG. 11 illustrates a configuration of a network entity, according to an embodiment of the disclosure.

As illustrated in FIG. 11, a network entity of the disclosure may include a transceiver 1110, a memory 1120, and a processor 1130. The processor 1130, the transceiver 1110, and the memory 1120 of the network entity may operate according to the above-described communication method of the network entity. However, constituent elements of the network entity are not limited to the above-description. For example, the network entity may include constituent elements more or less than the above-described constituent elements. In addition, the processor 1130, the transceiver 1110, and the memory 1120 may be implemented in the form of one chip. Further, the processor 1130 may include at least one processor. Various network entities described in the disclosure (e.g., AMF, SMF, base station, etc.) may correspond to the network entity of FIG. 11.

The transceiver 1110, which collectively refers to a receiver of the network entity and a transmitter of the network entity, may transceive signals with a base station. The signal transceived with the base station may include control information and data. To this end, the transceiver 1110 may include an RF transmitter for up converting and amplifying the frequency of transmitted signals and an RF receiver for low noise amplifying received signal and down converting frequencies thereof. However, this is merely one embodiment of the transceiver 1110, and the constituent elements of the transceiver 1110 are not limited to the RF transmitter and the RF receiver.

Further, the transceiver 1110 may receive signals through a wireless channel and output the signals to the processor 1130, and transmit the signals output from the processor 1130 through the wireless channel.

The memory 1120 may store programs and data needed for the operation of the network entity. Further, the memory 1120 may store control information or data included in the signals obtained by the network entity. The memory 1120 may include storage media such as ROM, RAM, hard disks, CD-ROMs, and DVDs, or a combination thereof.

The processor 1130 may control a series of processes so that the network entity operates according to the above-described embodiment of the disclosure. For example, the processor 1130 may receive control signals and data signals through the transceiver 1110 and process the received control signals and data signals. Further, the processor 1130 may transmit the processed control signal and data signal to the transceiver 1110.

The methods according to the embodiments described in the claims or specification of the disclosure may be implemented by hardware, software, or a combination of hardware and software.

When implemented by software, a computer-readable storage medium or a computer program product for storing one or more programs (software modules) may be provided. The one or more programs can be stored in a non-transitory computer-readable storage medium or computer program product and be configured for execution by one or more processors in an electronic device. The one or more programs may include instructions which make the electronic device to execute the methods according to the embodiments described in the claims or specification of the disclosure.

Such programs (software modules, software) may be stored in non-volatile memory including random access memory or flash memory, read only memory (ROM), electrically erasable programmable read-only memory (EEPROM), magnetic disc storage devices, compact disc-ROM (CD-ROM), digital versatile discs (DVDs), or other types of optical storage apparatuses or magnetic cassettes. Alternatively, the programs may be stored in memory including a combination of some or the whole thereof. Further, a plurality of constituent memories may be included.

Further, the programs may be stored in an attachable storage device that is accessible via a communication network such as the Internet, Intranet, local area networks (LANs), wide LANs (WLANs), or storage area network (SANs) communication networks, or a combination thereof. The storage apparatus may access an apparatus that performs an embodiment of the disclosure through an external port. Further, a separate storage apparatus on a communication network may access an apparatus that performs the embodiment of the disclosure.

In the above-described detailed embodiments of the disclosure, the constituent element included in the disclosure is expressed in a singular form or a plural form according to the detailed embodiment. However, the singular or plural expression is selected as being suitable for a given situation for the convenience of explanation, and the disclosure is not limited to a singular or plural form of constituent elements. Even the plurally expressed constituent elements may be composed of a single constituent element or vice versa.

According to an apparatus and method according to various embodiments of the disclosure, a mobile communication system may effectively provide services by supporting continuity of a session in a mobile communication network system that provides a network slice function.

The effects that can be obtained from the disclosure are not limited to the effects mentioned above, and other effects that are not mentioned could be clearly understood by those of skill in the art to which the disclosure pertains from the description below.

While, the disclosure has been shown and described with reference to various embodiments thereof, it will be understood by those skilled in the art that various changes in form and detail may be made therein without departing from the spirit and scope of the disclosure as defined by the appended claims and their equivalents.

Further, each embodiment can be operated in combination with each other as necessary. For example, one embodiment of the disclosure and parts of another embodiment may be combined with each other. Still further, the embodiments may be implemented in other systems, for example, LTE systems, 5G or NR systems, and other modified examples based on the technical concept of the above-described embodiment.

What is claimed is:

1. A method performed by a user equipment (UE) in a wireless communication system, the method comprising:
   establishing a protocol data unit (PDU) session in a first public land mobile network (PLMN);
   transmitting, to an access and mobility management function (AMF), a registration request message for moving to a second PLMN from the first PLMN;
   receiving, from the AMF, a registration accept message including allowed network slice selection assistance information (NSSAI), wherein the allowed NSSAI includes first mapped single-NSSAI (S-NSSAI);
   identifying whether second mapped S-NSSAI associated with the PDU session matches to the first mapped S-NSSAI included in the allowed NSSAI; and
   updating second mapped S-NSSAI of the first PLMN associated with the PDU session to first S-NSSAI in the allowed NSSAI in case that the second mapped S-NSSAI matches to the first mapped S-NSSAI,
   wherein the first S-NSSAI corresponds to the first mapped S-NSSAI.

2. The method of claim 1,
   wherein the first S-NSSAI comprises a first slice/service type (SST) and a first mapped home PLMN (HPLMN) SST, and
   wherein the second S-NSSAI comprises a second mapped HPLMN SST.

3. The method of claim 2, wherein the identifying whether the second mapped S-NSSAI matches to the first mapped S-NSSAI comprises identifying whether the first mapped HPLMN SST in the first S-NSSAI and the second mapped HPLMN SST in the second S-NSSAI are the same.

4. The method of claim 3,
   wherein the first S-NSSAI further comprises a first slice differentiator (SD) and a first mapped HPLMN SD,
   wherein the second S-NSSAI further comprises a second mapped HPLMN SD, and
   wherein the identifying whether the second mapped S-NSSAI matches to the first mapped S-NSSAI further comprises identifying whether the first mapped HPLMN SD and the second mapped HPLMN SD are the same.

5. The method of claim 2, further comprising triggering a local updating of the PDU session in response to receiving S-NSSAI comprising at least one piece of information about the first mapped HPLMN SST, an HPLMN slice differentiator (SD), a visited PLMN (VPLMN) SST, or a VPLMN SD.

6. The method of claim 5, further comprising storing the received S-NSSAI.

7. The method of claim 1,
   wherein the PDU session established in the first PLMN is used in the second PLMN by locally updating the second S-NSSAI to the first S-NSSAI, and
   wherein after the UE moves to the second PLMN the PDU session is used continuously and not released.

8. A method performed by an access and mobility management function (AMF) in a wireless communication system, the method comprising:
   receiving, from a user equipment (UE), established a protocol data unit (PDU) session in a first public land mobile network (PLMN), a registration request message for moving to a second PLMN from the first PLMN; and
   transmitting, to the UE, a registration accept message including allowed network slice selection assistance information (NSSAI),
   wherein the allowed NSSAI includes first mapped single-NSSAI (S-NSSAI),
   wherein whether second mapped S-NSSAI associated with the PDU session matches to the first mapped S-NSSAI included in the allowed NSSAI is identified by the UE,
   wherein second S-NSSAI of the first PLMN associated with the PDU session is updated to first S-NSSAI in the allowed NSSAI in case that the second mapped S-NSSAI matches to the first mapped S-NSSAI, and
   wherein the first S-NSSAI corresponds to the first mapped S-NSSAI.

9. The method of claim 8,
   wherein the first S-NSSAI comprises a first slice/service type (SST) and a first mapped home PLMN (HPLMN) SST, and
   wherein the second S-NSSAI comprises a second mapped HPLMN SST.

10. The method of claim 9, wherein the second S-NSSAI associated with the PDU session is locally updated to the first S-NSSAI in case that the first mapped HPLMN SST in the first S-NSSAI and the second mapped HPLMN SST in the second S-NSSAI are the same.

11. The method of claim 10,
    wherein the first S-NSSAI further comprises a first slice differentiator (SD) and a first mapped HPLMN SD,
    wherein the second S-NSSAI further comprises a second mapped HPLMN SD, and
    wherein the identifying whether the second mapped S-NSSAI matches to the first mapped S-NSSAI further comprises identifying whether the first mapped HPLMN SD and the second mapped HPLMN SD are the same.

12. The method of claim 8,
    wherein the PDU session established in the first PLMN is used in the second PLMN by locally updating the second S-NSSAI to the first S-NSSAI, and
    wherein after the UE moves to the second PLMN the PDU session is used continuously and not released.

13. A user equipment (UE) in a wireless communication system, the UE comprising:
a transceiver; and
at least one processor operably connected with the transceiver and configured to:
establish a protocol data unit (PDU) session in a first public land mobile network (PLMN),
transmit, to an access and mobility management function (AMF), by controlling the transceiver, a registration request message for moving to a second PLMN from the first PLMN,
receive, from the AMF, by controlling the transceiver, a registration accept message including allowed network slice selection assistance information (NSSAI), wherein the allowed NSSAI includes first mapped single-NSSAI (S-NSSAI),
identify whether second mapped S-NSSAI associated with the PDU session matches to the first mapped S-NSSAI included in the allowed NSSAI, and
update second S-NSSAI of the first PLMN associated with the PDU session to first S-NSSAI in the allowed NSSAI in case that the second mapped S-NSSAI matches to the first mapped S-NSSAI,
wherein the first S-NSSAI corresponds to the first mapped S-NSSAI.

14. The UE of claim 13,
wherein the first S-NSSAI comprises a first slice/service type (SST) and a first mapped home PLMN (HPLMN) SST, and
wherein the second S-NSSAI comprises a second mapped HPLMN SST.

15. The UE of claim 14, wherein the at least one processor is further configured to identify whether the first mapped HPLMN SST in the first S-NSSAI and the second mapped HPLMN SST in the second S-NSSAI are the same.

16. The UE of claim 15,
wherein the first S-NSSAI further comprises a first slice differentiator (SD) and a first mapped HPLMN SD,
wherein the second S-NSSAI further comprises a second mapped HPLMN SD, and
wherein the at least one processor is further configured to identify whether the first mapped HPLMN SD and the second mapped HPLMN SD are the same.

17. The UE of claim 13,
wherein the PDU session established in the first PLMN is used in the second PLMN by locally updating the second S-NSSAI to the first S-NSSAI, and
wherein after the UE moves to the second PLMN the PDU session is used continuously and not released.

18. An access and mobility function (AMF) in a wireless communication system, the AMF comprising:
a transceiver; and
at least one processor operably connected with the transceiver and configured to:
receive, from a user equipment (UE), established a protocol data unit (PDU) session in a first public land mobile network (PLMN), by controlling the transceiver, a registration request message for moving to a second PLMN from the first PLMN, and
transmit, to the UE, by controlling the transceiver, a registration accept message including allowed network slice selection assistance information (NSSAI), wherein the allowed NSSAI includes first mapped single-NSSAI (S-NSSAI),
wherein whether second mapped S-NSSAI associated with the PDU session matches to the first mapped S-NSSAI included in the allowed NSSAI is identified by the UE,
wherein second S-NSSAI of the first PLMN associated with the PDU session is updated to first S-NSSAI in the allowed NSSAI in case that the second mapped S-NSSAI matches to the first mapped S-NSSAI, and
wherein the first S-NSSAI corresponds to the first mapped S-NSSAI.

19. The AMF of claim 18,
wherein the first S-NSSAI comprises a first slice/service type (SST) and a first mapped home PLMN (HPLMN) SST, and
wherein the second S-NSSAI comprises a second mapped HPLMN SST.

20. The AMF of claim 19, wherein the second S-NSSAI associated with the PDU session is locally updated to the first S-NSSAI in case that the first mapped HPLMN SST in the first S-NSSAI and the second mapped HPLMN SST in the second S-NSSAI are the same.

21. The AMF of claim 20,
wherein the first S-NSSAI further comprises a first slice differentiator (SD) and a first mapped HPLMN SD,
wherein the second S-NSSAI further comprises a second mapped HPLMN SD, and
wherein the identifying whether the second mapped S-NSSAI matches to the first mapped S-NSSAI further comprises identifying whether the first mapped HPLMN SD and the second mapped HPLMN SD are the same.

22. The AMF of claim 18,
wherein the PDU session established in the first PLMN is used in the second PLMN by locally updating the second S-NSSAI to the first S-NSSAI, and
wherein after the UE moves to the second PLMN the PDU session is used continuously and not released.

* * * * *